United States Patent

Palanisamy et al.

(10) Patent No.: US 6,553,816 B1
(45) Date of Patent: Apr. 29, 2003

(54) SYSTEM AND METHOD FOR PROVIDING ENGINE DIAGNOSTIC AND PROGNOSTIC INFORMATION

(75) Inventors: Thirumalai G. Palanisamy, Morris Township, Morris County, NJ (US); Bernard P. Gollomp, Palisades, NY (US)

(73) Assignee: AlliedSignal Inc., Morristown, NJ (US)

(*) Notice: Subject to any disclaimer, the term of this patent is extended or adjusted under 35 U.S.C. 154(b) by 0 days.

(21) Appl. No.: 09/398,889

(22) Filed: Sep. 16, 1999

Related U.S. Application Data (60) Provisional application No. 60/100,983, filed on Sep. 18, 1998.

(51) Int. Cl.[7] ............................................. G01M 15/00
(52) U.S. Cl. ....................................... 73/118.1; 324/378
(58) Field of Search ................. 73/116, 117.2, 73/117.3, 118.1; 324/378

(56) References Cited

U.S. PATENT DOCUMENTS

| | | | | |
|---|---|---|---|---|
| 3,839,906 A | * | 10/1974 | Hanson | 73/115 |
| 3,870,954 A | * | 3/1975 | Hanson et al. | |
| 3,938,378 A | * | 2/1976 | Fineman et al. | 73/117.2 |
| 3,952,586 A | * | 4/1976 | Hanson et al. | 73/117.2 |
| 3,968,425 A | * | 7/1976 | Hanson et al. | |
| 4,027,532 A | * | 6/1977 | Trussell et al. | 73/117.2 |
| 4,050,296 A | * | 9/1977 | Benedict | 73/116 |
| 4,050,297 A | * | 9/1977 | Pettingell et al. | 73/117.2 |
| 4,062,232 A | * | 12/1977 | Sutphin, Jr. | 73/117.2 |
| 4,144,746 A | * | 3/1979 | Maringer et al. | 73/117.2 |
| 4,309,900 A | * | 1/1982 | Kreft et al. | 73/117.2 |
| 4,809,540 A | | 3/1989 | Lackner et al. | 73/117.2 |
| 5,160,892 A | | 11/1992 | Makhija et al. | 324/379 |
| 5,585,717 A | | 12/1996 | Eriksson et al. | 324/166 |
| 5,601,058 A | | 2/1997 | Dyches et al. | 123/179.2 |
| 5,929,609 A | * | 7/1999 | Joy et al. | |
| 5,992,365 A | | 11/1999 | Vilou | 123/179.3 |

* cited by examiner

*Primary Examiner*—Eric S. McCall (57) ABSTRACT

A system and method for obtaining engine diagnostic and prognostic information utilizing current, time and crank position data obtained from the starter motor during the starting of an engine and represented as a starter motor current waveform. The time domain waveform is transformed to the spatial domain. Thereafter, the spatial waveform is deconvolved into its constituent components using known digital signal processing, such as Fourier Transformations, and along with derived engine parameters provide engine status and diagnostic information. Weibull techniques may be used to further process the engine status and diagnostic information to improve accuracy.

15 Claims, 7 Drawing Sheets

SYSTEM AND METHOD FOR PROVIDING ENGINE DIAGNOSTIC AND PROGNOSTIC INFORMATION

CROSS-REFERENCE TO RELATED APPLICATIONS

This application claims the benefit of U.S. Provisional Application No. 60/100,983, filed on Sep. 18, 1998.

FIELD OF THE INVENTION

The present invention relates to engine diagnostics. More particularly, the invention is directed to a system and method for monitoring, analyzing and diagnosing internal combustion engine conditions using a starter motor as a sensor and employing spatial analysis techniques.

DESCRIPTION OF RELATED ART

A wide range of on-board or off-board internal combustion (IC) diagnostic systems are employed in engine control systems for monitoring engine condition and performance. For example, the Ford OASIS and the General Motors car automotive maintenance (CAM) diagnostic systems employ existing sensors and computational resources, such as an Engine Control Unit (ECU). When acceptable conditions or tolerance limits are exceeded, in any of the sensed parameters, an annunciator or indicator is enabled. In some systems, such as the Ford OASIS the fault conditions may be stored and retrieved for subsequent off-board diagnostics. Avionics equipment also employ a variety of on-board implementations to sense failure conditions and also to indicate apparently operational ready conditions.

Conventional diagnostic systems require the use of a variety of temporarily connected or mounted sensors and interfacing devices. In addition, current diagnostic systems do not monitor condition and/or performance of internal engines, such as a Diesel Cycle (Compression Ignition) and Otto Cycle (Spark Ignition) engines. Most diagnostic and prognostic techniques rely upon intrusive techniques, such as cylinder compression, which interfere with normal engine operation and provide only static test information. In addition such techniques are costly and time-consuming.

As far as is known, only two research projects conducted at Purdue University and Wayne State University were directed towards developing dynamic, in-situ methods for determining internal engine operation and condition. These research projects were directed toward developing a method using a rotating disk having precisely machined teeth or lobes on its periphery and a crankshaft mounted to the disk. The disk, in turn, was mounted on the crankshaft. As the disk or flywheel was rotated, either a magnetic or Hall-Effect sensor was used to measure the instantaneous angular velocity, i.e., the crankshaft RPM, and time between passing of the successive teeth or lobes. Increased cost, as well as the smoothing or filtering effects of harmonic balancing, and the lack of capability to relate the acquired information to any specific cylinder, were just some of the deficiencies that led to the failure of the project. A similar implementation was developed within the then Bendix Automotive Sector, now Allied Signal, for sensing rough engine operation. This system also proved to be too costly and its operation proved unreliable in the hostile automotive environment.

It is therefore desirable to develop a reliable and relatively low cost non-intrusive on-board system and method that provides diagnostic and prognostic engine information, such as impending wear or failure conditions, and solves the aforementioned problems.

SUMMARY OF THE INVENTION

The present invention provides an internal engine diagnostic and prognostic system and method utilizing current, time and crank position data. The current supplied to a starter motor by a battery during engine start up is monitored using a current sensor and a representative starter motor current waveform is generated. In addition, crank position information is provided by a crank position sensor or derived from other sources, for example, the ECU, the fueling system or the ignition system.

The present invention uses the starter motor as both an actuator and a sensor. Consistent relationships between piston stroke and angular crankshaft rotation in an engine are used to spatially normalize the starter motor current waveform. Once spatial consistency has been established, the starter motor current waveform is reduced or deconvolved into its constituent parts, that is, subharmonics, fundamental and harmonic components. The deconvolved waveform components and derived and/or known engine parameters are then used to determine engine status and diagnostic information.

Prognostic and maintenance planning information is derived from the previously derived status and diagnostic information by applying Weibull techniques. Weibull techniques are well known statistical failure distributions that are used in engineering applications to determine and model the mechanical wear of a machine.

BRIEF DESCRIPTION OF THE DRAWING

The invention will be more fully understood and further advantages will become apparent when reference is made to the following detailed description of the preferred embodiments of the invention and the accompanying drawings, in which.

DETAILED DESCRIPTION OF THE INVENTION

It is understood that engine components wear and fail causing engine performance to deteriorate. The condition of the piston rings, cylinders and valves effect the torque required to crank an engine during starting. For instance, wearing of piston rings and/or valves results in a gradual reduction of the starting torque required by the starting motor, and accordingly reduced motor current demands. In addition, fueling (i.e. fuel injection) and ignition also have an impact on the starting motor, which in turn, is reflected in the current supplied to the starting motor. Degradations and failures, such as those mentioned above, exhibit their symptoms in the starter motor current waveform.

Figure 2:
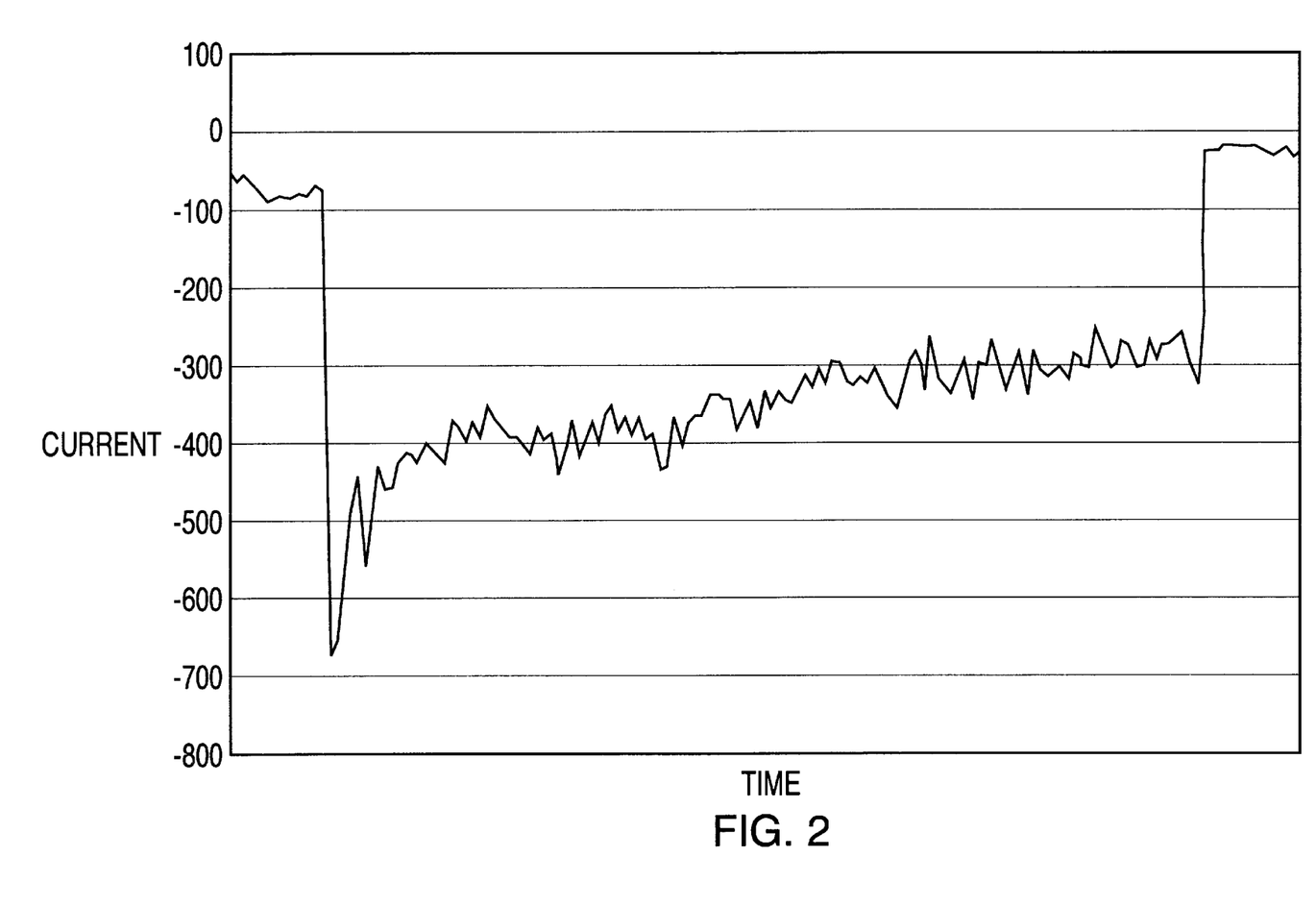
FIG. 2 is an exemplary graphical representation of starter motor current consumed by a starting motor used to start a high compression, fuel injected 12-cylinder engine.
Figure 3:
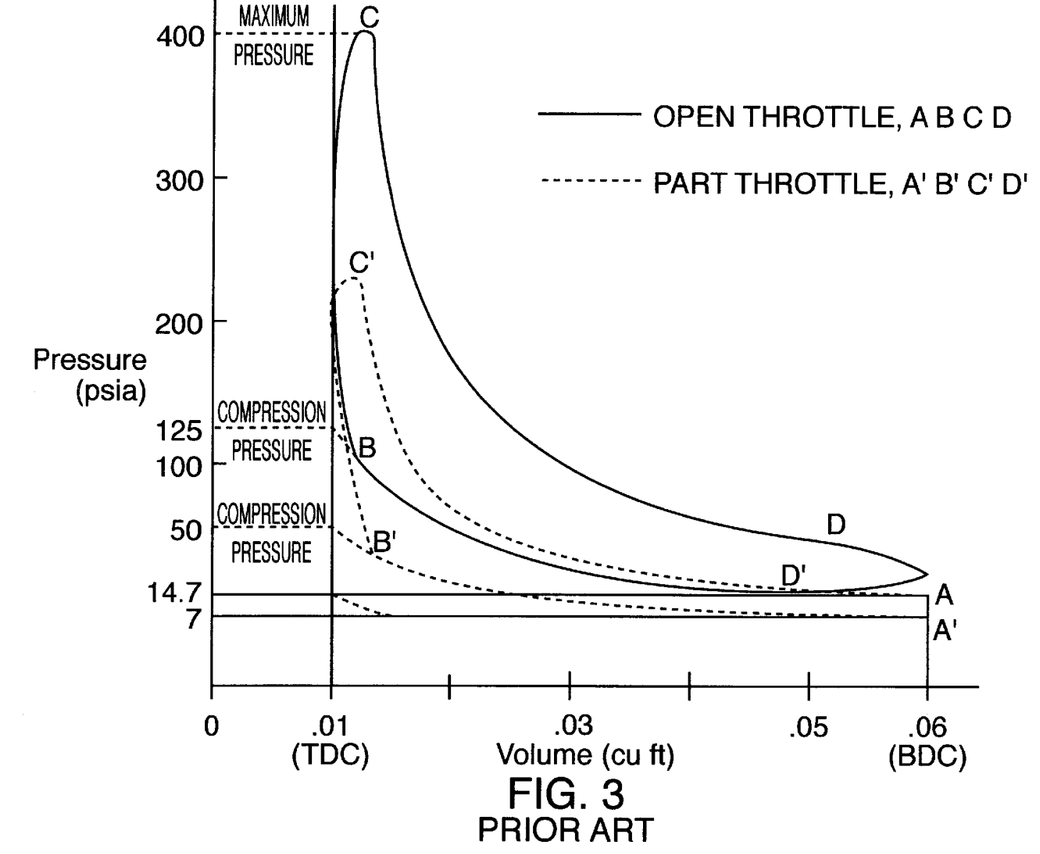
FIG. 3 is a prior art pressure-volume graphical representation for a spark ignition engine showing the effects of throttling.

FIG. 2 is an exemplary graphical representation of the current delivered to a starter motor of a relatively high compression, fuel-injected, 12-cylinder engine during an engine starting cycle. The starter motor current waveform, shown in FIG. 2, is typical for multi-cylinder Spark Ignition and High Compression Ignition engines. Since the current provided to the starter motor is a function of the torque delivered by an electric motor, the starter motor current waveform also portrays the torque delivered to the engine during the starting cycle. In essence, the starter motor performs a dual role as an actuator as well as a sensor for determining when the torque must be increased during the adiabatic compression stroke for each cylinder cycle. Similarly, the starter motor current waveform reflects when the required torque is low or even negative during an expansion cycle. Consequently, engine diagnostic information may be extracted from the components of the starter motor current waveform shown in FIG. 2 to construct or generate pressure-volume timing diagrams, similar to those shown in FIGS. 3, 6 and 7. The sampling rate of the current may be adjusted as desired, wherein the higher the frequency or rate of sampling the more accurate the diagnostic information. Due to the fact that the constituent components of the starter motor current waveform are not time consistent, that is, the maxima and minima intervals or periods continuously change, resolving such waveforms into their constituent components using known time deconvolving techniques, such as Fourier transforms, would not produce accurate representations of its constituent components.

Nevertheless, spatially consistent or fixed relationships do exist. In particular, piston travel, valve opening and closing, fuel injection, and ignition have spatially consistent angular relationships. Since piston travel is spatially consistent, and volume of a pressure-volume diagram and compression ratio are functions of piston travel, significant diagnostic and prognostic information can be derived from the starter motor current waveform shown in FIG. 2. Conventional peak detection and associated processing techniques, described in detail below, are used to transform the non-periodic time domain starter motor current waveform to a uniform spatial domain.

Figure 4:
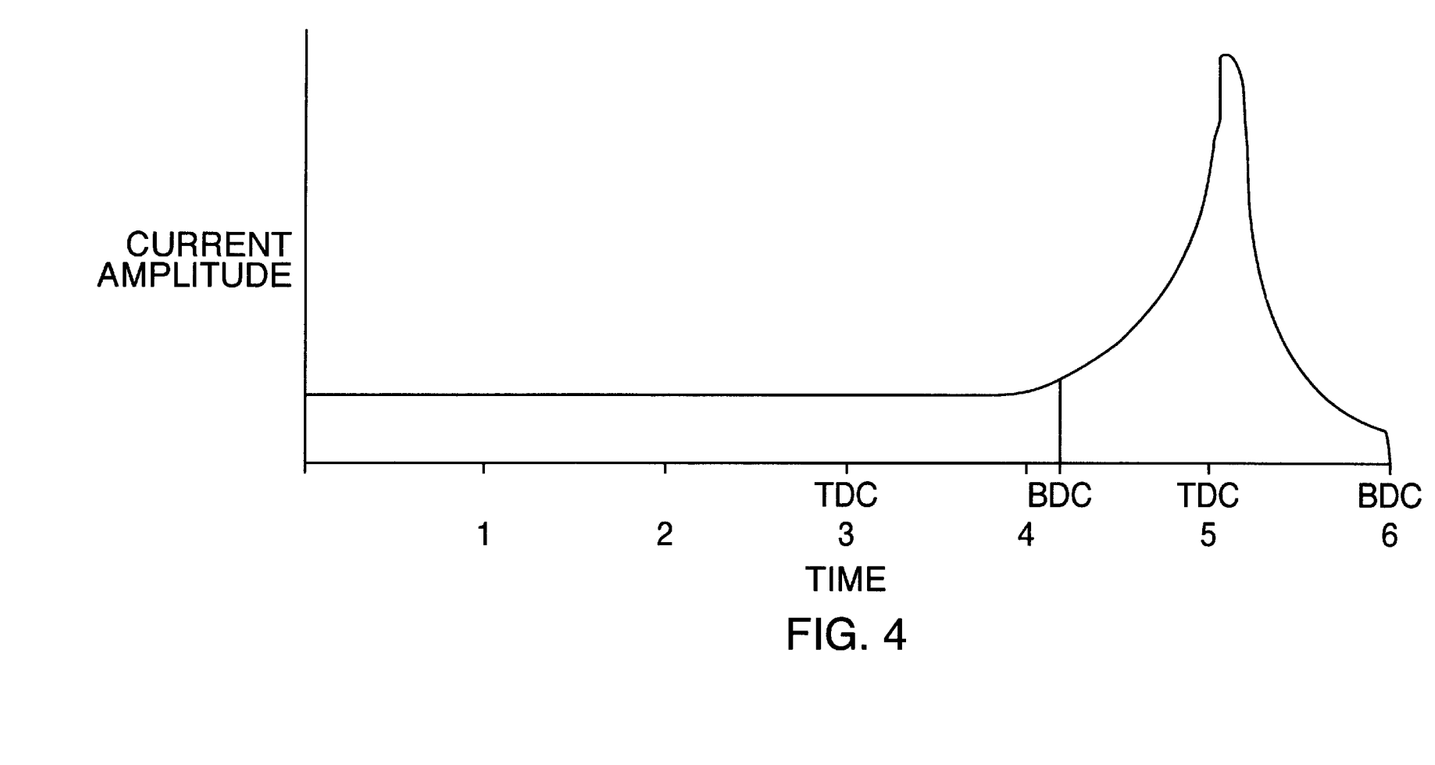
FIG. 4 is a graphical representation of the normalized amplitude vs. time during the start cycle of an engine.
Figure 5:
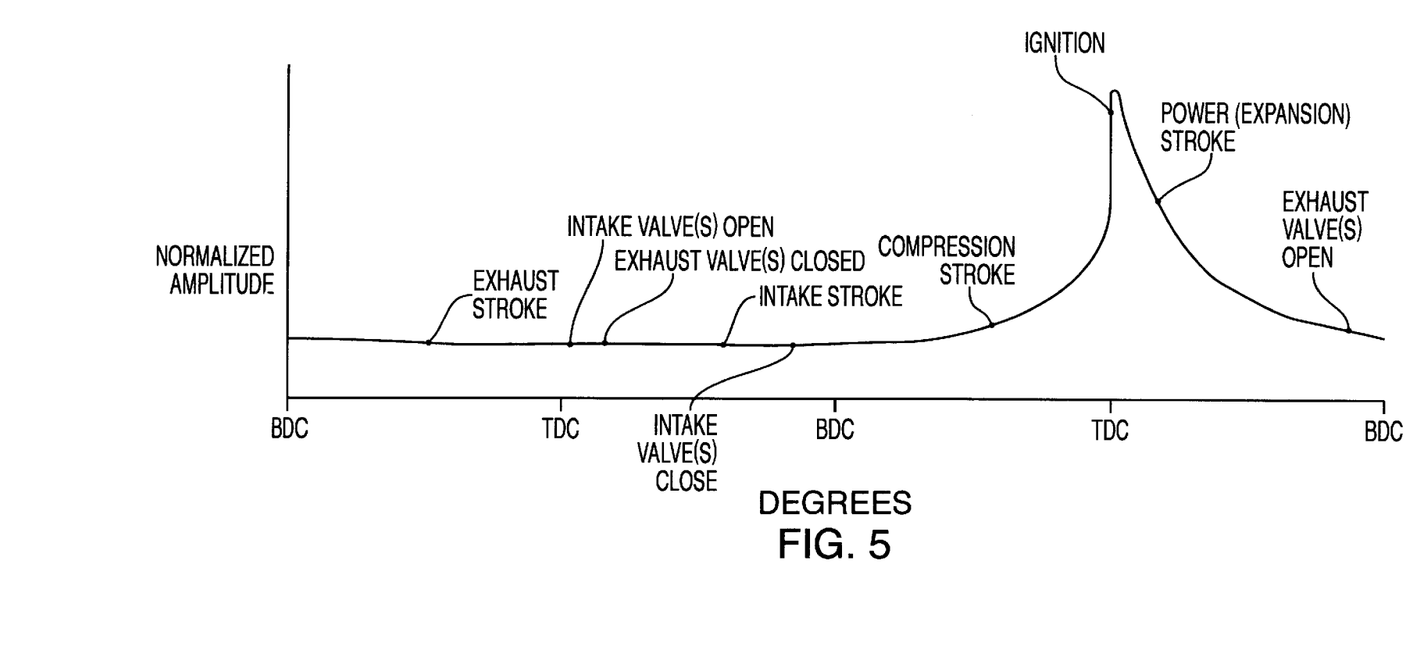
FIG. 5 is a graphical representation of the waveform shown in FIG. 4 after having been transformed to the spatial domain.

FIGS. 4 and 5 are graphical representations of one of the current lobes depicted in the starter motor current waveform of FIG. 2. The curves shown in FIGS. 4 and 5 are smoothed for illustrative purposes, and include all the information of the respective current lobe. The Bottom Dead Center (BDC) and Top Dead Center (TDC) positions are identified therein. In particular, FIG. 4 depicts the amplitude of one cylinder prior to spatial transformation. Since the starter torque is a function of starter motor current, constant torque produces uniform accelerated motion. Thus, the crank position (i.e., piston position) varies accordingly. As discussed previously, as a result of the known or constant information, which includes piston travel (i.e., both length and relative to other pistons), motion is uniformly accelerated.

FIG. 5 is a graphical representation of the information shown in FIG. 4 after having been transformed from the non-periodic time domain to the uniform spatial domain. By using Fourier Transformation techniques, the waveform shown in FIG. 5 may be deconvolved into its components for further condition analyses, and for separating the effects of overlapping piston influences (e.g., piston travel overlaps).

Figure 6:
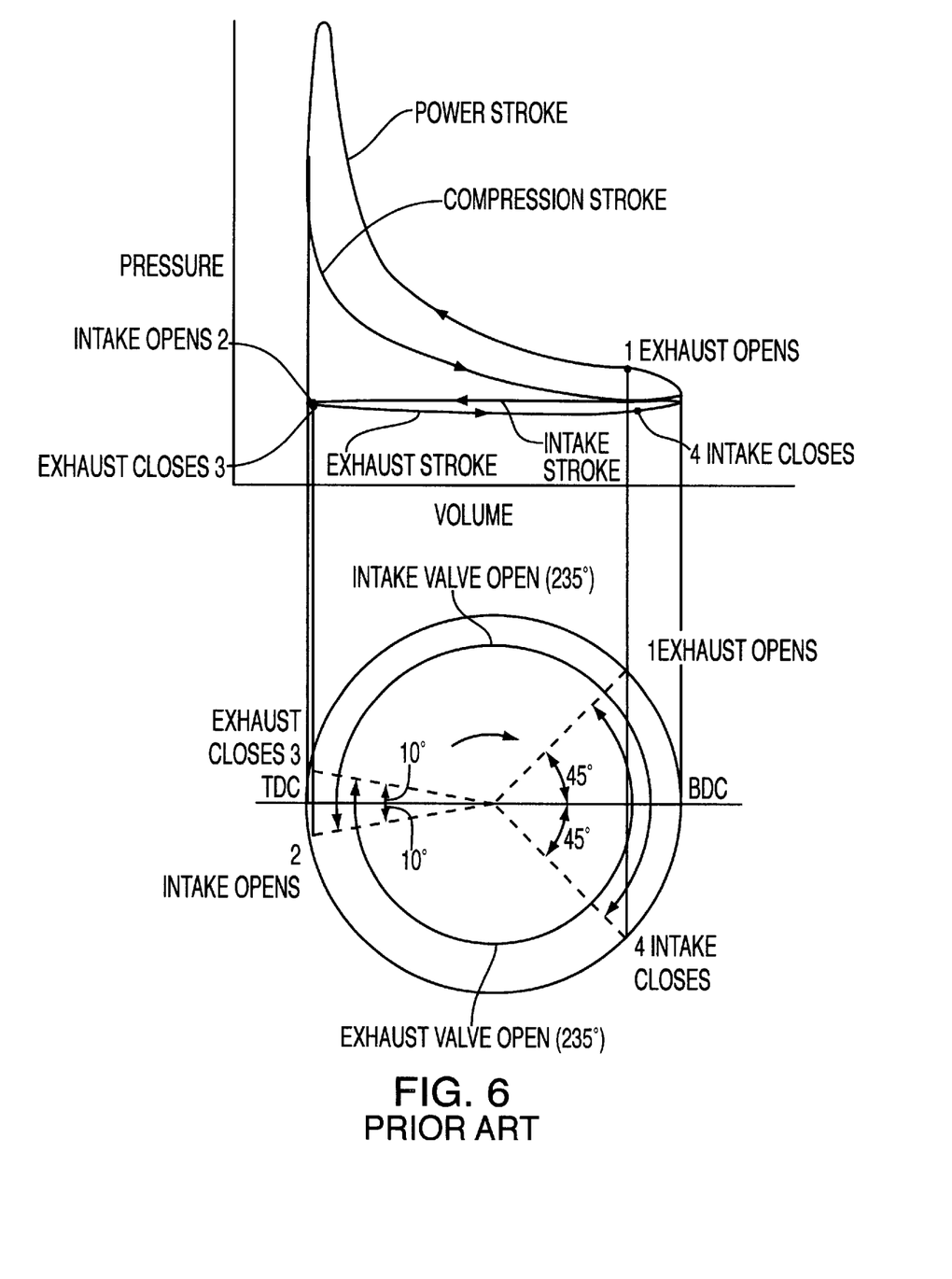
FIG. 6 is a prior art graphical and schematic representation of a pressure-volume diagram and associated pressure-timing circular timing diagram for a four-stroke is engine.
Figure 7:
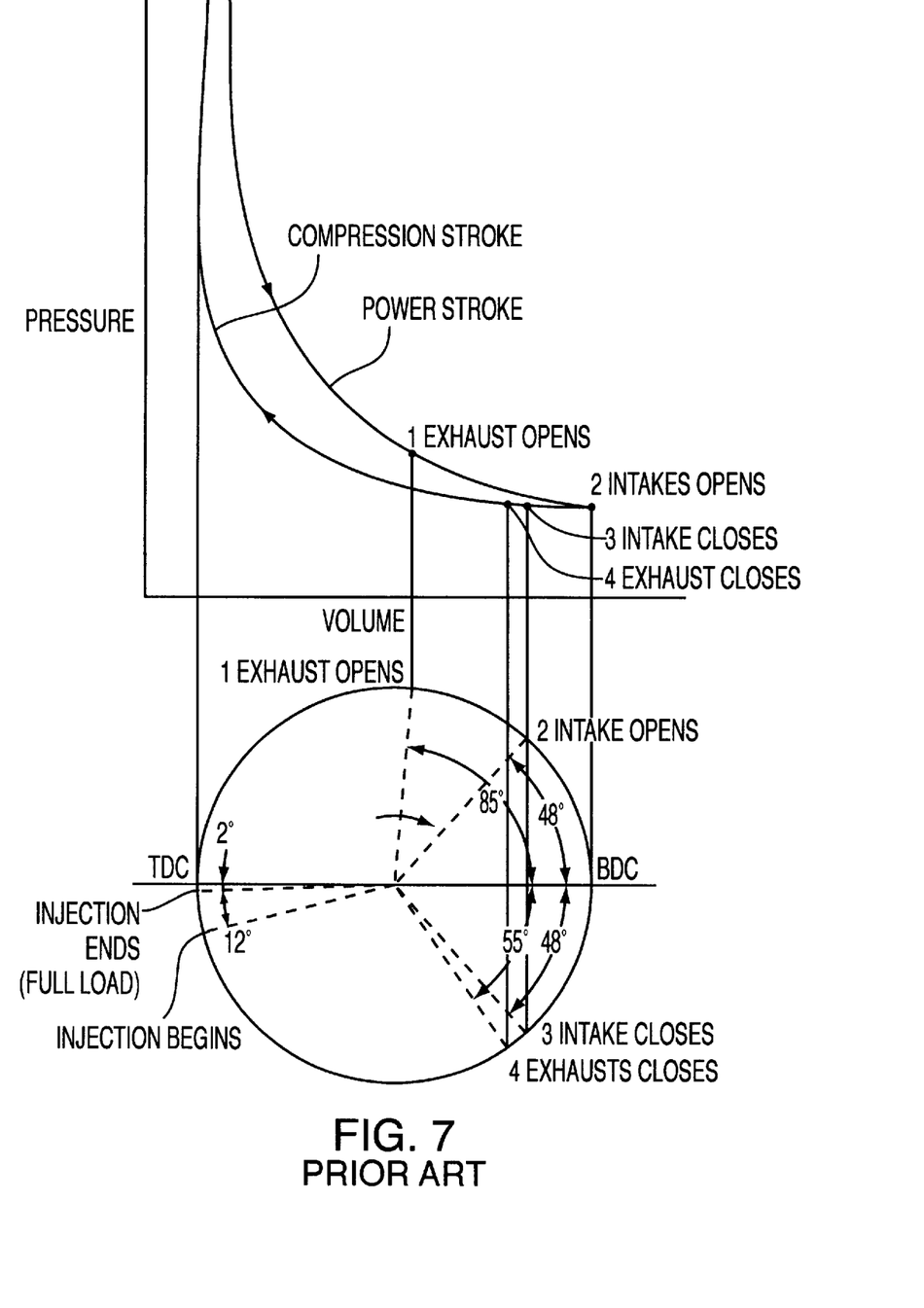
FIG. 7 is a prior art graphical and schematic representation a pressure-volume diagram and associated pressure-timing circular timing diagram for a two-stroke engine.

FIGS. 6 and 7 show prior art pressure-volume (PV) and timing diagrams for four stroke and two-stroke valve timing, respectively, in an engine. An exemplary description is provided for relating the PV diagrams of FIGS. 6 and 7 to the curve of FIG. 5. The intake valve opens before TDC so that the valve will be somewhat open at the start of the intake stroke. The intake valve remains open during the early part of the compression stroke to increase the charging of the cylinder at relatively high speed. Similarly, the exhaust valve opens before the power stroke is completed to insure that the pressure in the cylinder will approach atmospheric pressure before the piston begins the exhaust stroke. As can be seen from the figure, both the intake and exhaust valves may be open at the end of the exhaust stroke (or beginning of the intake stroke). Valves exhibiting this timing are said to be overlapped. Overlapped valves are generally used to obtain maximum power at relatively high speeds.

The curve shown in FIG. 5 may be folded such that all three BDC points and both TDCs overlap, the resulting PV diagram would be similar to those shown in FIGS. 6 and 7. Thus, further confirming the spatial consistency derivable from the starter motor current waveform shown in FIG. 5.

Figure 1:
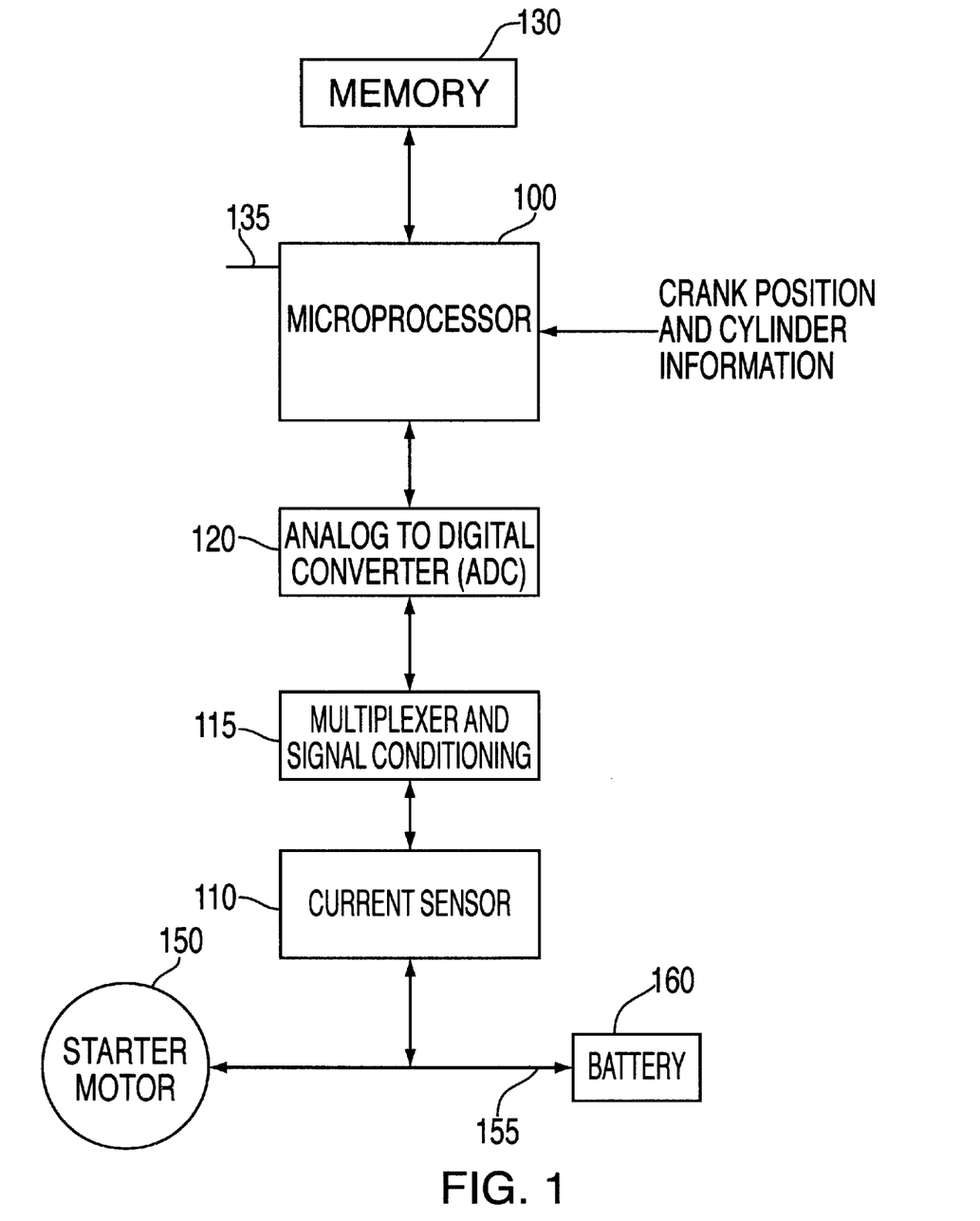
FIG. 1 is a block diagram of an engine diagnostic and prognostic system in accordance with the present invention.

Referring to the block diagram in FIG. 1, the engine diagnostic and prognostic system in accordance with the present invention includes a microprocessor 100 that receives as input current by way of a current sensor 110 (e.g., precision shunt, Hall Effect Device), a multiplexer and signal conditioning circuit 115, and analog-to-digital converter 120. As previously mentioned, the current, time and crank position data is acquired during engine starting by monitoring the starter motor current. Crank position information is obtained from the crank position sensor or from derivative information provided by the ECU, ignition system (for Spark Ignition engines), or the fuel injection system (for Compression Ignition engines). The information concerning crank position is used to further improve the accuracy of deconvolving the starter motor current waveform into its constituent components and associate contributions to specific cylinders. Engine status and diagnostic information received by the microprocessor 100 is stored in a memory 130. Memory 130 may be any suitable known non-volatile memory type (e.g., electronically alterable) that will retain its memory contents when power is removed. The stored engine status and diagnostic information may be accessed via a communications port 135, such as an EIA-RS-232, EIA-RS432, EIA-RS-422, EIA-RS485, IEEE-1394 or J1850 communication ports, of the microprocessor 100 to download or off-load engine status and diagnostic information into a remote memory device (not shown) for archival storage and later analysis by another computer.

In operation, current, time and crank position data is collected by monitoring the current discharged to the starter motor during engine starting. A starter motor current waveform is generated based on the obtained current and time data. The crank position data obtained from the crank sensor, ECU, fueling system or ignition system, is used as spatial markers along with the engine firing order to represent the monitored current and times into cylinder data frames or modules. Thereafter, engine stroke, valve ignition time and other engine angle and crank related angle specifications are used to transform the waveform from the time to the spatial domain. In addition, current angle slopes may be used for angle position correction. Once spatially consistent angular displacement and/or relations have been established, digital signal processing, for example, Fast Fourier Transforms (FFT) and Inverse Fast Fourier Transforms (IFFT), may be applied to resolve the waveform into its constituent parts to separate the effects of overlapping piston influences. The implementation of the transformation is a matter of design choice, and can be performed, for example, digitally or using well known algorithms. (See, Oppenheim, Alan V., Schafer, Ronald W, "Digital Signal Processing" Prentice Hall, 1975). Other known transformation techniques may be employed without departing from the scope of this disclosure.

It should be noted that if a cylinder is not firing or is completely leaking, then the starter motor current waveform for that particular cylinder with be a substantially straight line without any maxima or minima. In this situation, diagnostic information may be obtained directly from the starter current waveform without having to transform from the time to the spatial domain. Even in this case, transformation from the time to the spatial domain may be performed to identify which cylinder is working improperly.

The deconvolved information is then used to verify the correctness of the process for developing the spatial consistency. Deconvolved components, along with derived and/or known engine parameters (e.g., nominal stroke, compression ratio and valve timing) provide engine status and diagnostic information.

The mechanical wear of a machine, and in this instance an engine, has long been recognized to follow a Weibull curve. Weibull techniques are widely accepted in engineering for application of statistical reliability problems. As such, Weibull techniques may be implemented in either or both an on-board system, and a computer used to archive and analyze and report fleet engine conditions. The Weibull distribution techniques are particularly useful in engineering applications because of their ability to model various other statistical distributions. There are several methods to performing Weibull analysis that may be used in accordance with the present invention. For example, one method involves linearizing the Weibull cumulative distribution function and using the method of least squares to determine the Weibull parameters. Another method utilizes specially calibrated Weibull distribution graph paper. Both of these methods may alternatively be applied using a computerized system programmed to perform the Weibull distribution techniques.

By employing Weibull techniques on the foregoing status and diagnostic information, prognostic and maintenance planning information with relatively high confidence levels may be realized. In addition, well known regression analysis techniques may also be used. Regression analysis performs a comparison of data between current operating conditions and past operating conditions.

The engine diagnostic and prognostic system in accordance with the present invention may be implemented in a maintenance shop or engineering test system, which in turn, may be part of diagnostic systems, such as Ford OASIS or General Motors CAM. In addition, the present inventive engine diagnostic and prognostic system may be a dedicated system in a vehicle or be incorporated within an existing electronics system. The system in accordance with the present invention is also suitable for the Vehicle Power and Management System and Method disclosed in U.S. Pat. No. 5,929,609.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An engine diagnostic and prognostic system comprising:
   a current sensor fort monitoring current delivered to a starter motor during an engine cycle and
   a microprocessor for receiving said monitored current, generating a starter current waveform, transforming said starter current waveform from a time domain waveform to a spatial domain waveform, resolving said spatial domain waveform into constituent parts to separate effects of overlapping piston influences, and determining engine status and diagnostic information from said spatial domain waveform;
   wherein Weibell techniques are applied to said diagnostic information to generate prognostic information.

2. The system according to claim 1, wherein said microprocessor transforms said starter motor current waveform from the time domain to the spatial domain by representing the monitored current into cylinder data frames based on crank position data as time markers and engine firing order.

3. The system according to claim 2, wherein said microprocessor transforms said starter motor current waveform from the time domain to the spatial domain based on at least one of engine stroke, valve ignition time and other engine angle and crank related angle specifications.

4. The system according to claim 1, wherein said microprocessor applies the Weibell techniques to said diagnostic information to generate the prognostic information.

5. The system according to claim 1, further comprising an off-board computing system for applying the Weibell techniques to said diagnostic information to generate the prognostic information.

6. A method for providing diagnostic and prognostic information of a vehicle comprising the steps of:
   starting the engine of the vehicle;
   monitoring current delivered to a starter motor during an engine cycle;
   generating a starter motor current waveform representative of the monitored current;
   performing a mathematical transformation on said starter motor current waveform to transform said starter motor current waveform from a time domain waveform to a spatial domain waveform based on spatially consistent engine parameters including piston stroke and angular crankshaft rotation in the running engine; and
   determining engine status and diagnostic information based on the spatial domain waveform.

7. The method in accordance with claim 6, further comprising the step of resolving said spatial domain waveform into constituent parts to separate the effects of overlapping piston influences.

8. The method according to claim 6, wherein said monitoring step comprises detecting the current delivered to the starter motor using a current sensor.

9. The method according to claim 6, wherein said step of performing a mathematical transformation comprises representing monitored current times in cylinder data frames using crank position data as spatial markers and engine firing order.

10. The method according to claim 9, wherein said crank position data is obtained from one of a crank position sensor, engine control unit, ignition system, and fueling system.

11. A method for providing engine diagnostic and prognostic information comprising the steps of:
    monitoring current delivered to a starter motor during an engine starting cycle;

generating a starter current waveform representative of said monitored current;

transforming said starter current waveform from a time domain waveform to a spatial domain waveform based on spatially consistent engine parameters;

resolving said spatial domain waveform into constituent parts to separate the effects of overlapping piston influences, said resolving step comprising deconvolving the waveform into subharmonic, fundamental, and harmonic constituent parts; and determining engine status and diagnostic information based on the spatial domain waveform.

12. A method for providing engine diagnostic and prognostic information comprising the steps of:

monitoring current delivered to a starter motor during an engine starting cycle;

generating a starter motor current waveform representative of said monitored current;

transforming said starter motor current waveform from a time domain waveform to a spatial domain waveform based on spatially consistent engine parameters;

resolving said spatial domain waveform into constituent parts to separate the effects of overlapping piston influences, said resolving step comprising performing a Fast Fourier Analysis; and determining engine status and diagnostic information based on the spatial domain waveform.

13. A method for providing engine diagnostic and prognostic information comprising the steps of:

monitoring current delivered to a starter motor during an engine starting cycle;

generating a starter motor current waveform representative of said monitored current;

transforming said starter motor current waveform from a time domain waveform to a spatial domain waveform based on spatially consistent engine parameters;

resolving said spatial domain waveform into constituent parts to separate effects of overlapping piston influences, said resolving step comprising performing an Inverse Fast Fourier Analysis; and determining engine status and diagnostic information based on the spatial domain waveform.

14. A method for providing engine diagnostic and prognostic information comprising the steps of:

monitoring current delivered to a starter motor during an engine starting cycle;

generating a starter motor current waveform representative of said monitored current;

transforming said starter motor current waveform from a time domain waveform to a spatial domain waveform based on spatially consistent parameters;

resolving said spatial domain waveform into constituent parts to separate the effects of overlapping piston influences;

determining engine status and diagnostic information based on the spatial domain waveform; and applying Weibell techniques to generate prognostic information.

15. An engine diagnostic and prognostic system comprising:

a current sensor for monitoring current delivered to a starter motor during an engine starting cycle; and a microprocessor for receiving said monitored current, generating a starter current waveform, transforming said starter current waveform from a time domain waveform to a spatial domain waveform, resolving the spatial domain waveform into constituent parts to separate the effects of overlapping piston influences, using one of Fast Fourier and Inverse Fast Fourier Transform analysis, and determining engine status and diagnostic information from said spatial domain waveform.

* * * * *